US011531583B2

(12) United States Patent
Ghatak

(10) Patent No.: US 11,531,583 B2
(45) Date of Patent: Dec. 20, 2022

(54) METHODS AND SYSTEMS FOR SELF-HEALING IN CONNECTED COMPUTING ENVIRONMENTS

(71) Applicant: NETAPP, INC., San Jose, CA (US)

(72) Inventor: Kausik Ghatak, Bengaluru (IN)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/525,161

(22) Filed: Nov. 12, 2021

(65) Prior Publication Data

US 2022/0075683 A1      Mar. 10, 2022

Related U.S. Application Data

(63) Continuation of application No. 17/011,372, filed on Sep. 3, 2020, now Pat. No. 11,188,413.

(51) Int. Cl.
*G06F 11/00* (2006.01)
*G06F 11/07* (2006.01)
(Continued)

(52) U.S. Cl.
CPC ........ *G06F 11/0793* (2013.01); *G06F 11/079* (2013.01); *G06F 11/0709* (2013.01);
(Continued)

(58) Field of Classification Search
CPC ............. G06F 11/0703; G06F 11/0709; G06F 11/0727; G06F 11/079; G06F 11/0793; G06F 11/2247; G06F 11/2252; G06F 11/2257; G06F 11/2261; G06F 11/3409; G06F 11/3457; G06F 11/3466; G06F 11/3612; H04L 41/06; H04L 41/0631;
(Continued)

(56) References Cited

U.S. PATENT DOCUMENTS 10,621,020 B2 *  4/2020  Joshi ................... G06F 11/0709
10,963,326 B1 *  3/2021  Bernat ................. G06F 3/0683
(Continued)

OTHER PUBLICATIONS

Cardoso, Nuno, and Rui Abreu. "Self-healing on the cloud: State-of-the-art and future challenges." In 2012 Eighth International Conference on the Quality of Information and Communications Technology, pp. 279-284. IEEE, 2012. (Year: 2012).*
(Continued)

*Primary Examiner* — Anthony J Amoroso
(74) *Attorney, Agent, or Firm* — Loza & Loza, LLP; Tejinder Singh

(57) ABSTRACT

Methods and systems for networked systems are provided. A reinforcement learning (RL) agent is deployed during runtime of a networked system having at least a first component and a second component. The RL agent detects a first degradation signal in response to an error associated with the first component and a second degradation signal from the second component, the second degradation signal generated in response to the error. The RL agent identifies from a learned data structure an action for fixing degradation, at both the first component and the second component; and continues to update the learned data structure, upon successful and unsuccessful attempts to fix degradation associated with the first component and the second component.

20 Claims, 12 Drawing Sheets

(51) Int. Cl.
    *G06K 9/62*     (2022.01)
    *G06F 11/36*     (2006.01)
    *G06F 11/34*     (2006.01)
    *G06F 11/22*     (2006.01)
    *H04L 41/0681*     (2022.01)

(52) U.S. Cl.
    CPC ...... *G06F 11/0727* (2013.01); *G06F 11/2257* (2013.01); *G06F 11/3457* (2013.01); *G06F 11/3612* (2013.01); *G06K 9/6262* (2013.01); *H04L 41/0681* (2013.01); *G06F 11/3409* (2013.01)

(58) Field of Classification Search
    CPC ............. H04L 41/0636; H04L 41/0645; H04L 41/065; H04L 41/0677; H04L 41/0681; G06K 9/00; G06K 9/6262; G06K 9/6263; G06K 9/6264; G06K 9/6265; G06V 10/10; G06V 10/20; G06V 10/776; G06V 10/778; G06V 30/1916; G06V 30/19167; G06V 30/302
    See application file for complete search history.

(56) References Cited

U.S. PATENT DOCUMENTS

| | | | | |
|---|---|---|---|---|
| 11,042,145 | B2* | 6/2021 | Zhang | G06N 7/005 |
| 2020/0074241 | A1* | 3/2020 | Mahmood | G06K 9/6263 |
| 2021/0150417 | A1* | 5/2021 | Fadel Argerich | G06N 20/20 |

OTHER PUBLICATIONS

Park, Jeongmin, Giljong Yoo, and Eunseok Lee. "Proactive self-healing system based on multi-agent technologies." In Third ACIS Int'l Conference on Software Engineering Research, Management and Applications (SERA'05), pp. 256-263. IEEE, 2005. (Year: 2005).*

Anghel, Ionut, Tudor Cioara, Ioan Salomie, Mihaela Dinsoreanu, and Anca Rarau. "A policy driven self-healing algorithm for context aware systems." In 2009 IEEE 5th International Conference on Intelligent Computer Communication and Processing, pp. 229-236. IEEE, 2009. (Year: 2009).*

Xu, Tao, Dian Shen, Huanhuan Zhang, Runqun Xiong, and Jiahui Jin. "Fault diagnosis for the virtualized network in the cloud environment using reinforcement learning." In 2019 IEEE International Conference on Smart Cloud (SmartCloud), pp. 231-236. IEEE, 2019. (Year: 2019).*

Psaier, Harald, Florian Skopik, Daniel Schall, and Schahram Dustdar. "Behavior monitoring in self-healing service-oriented systems." In 2010 IEEE 34th Annual Computer Software and Applications Conference, pp. 357-366. IEEE, 2010. (Year: 2010).*

Velasco, Luis, and Danish Rafique. "Fault management based on machine learning." In 2019 Optical Fiber Communications Conference and Exhibition (OFC), pp. 1-3. IEEE, 2019. (Year: 2019).*

Elmajed, Arij, Armen Aghasaryan, and Eric Fabre. "Machine learning approaches to early fault detection and identification in NFV architectures." In 2020 6th IEEE Conference on Network Softwarization (NetSoft), pp. 200-208. IEEE, 2020. (Year: 2020).*

Ghiasvand, Siavash, and Florina M. Ciorba. "Anomaly detection in high performance computers: A vicinity perspective." In 2019 18th International Symposium on Parallel and Distributed Computing (ISPDC), pp. 112-120. IEEE, 2019. (Year: 2019).*

Kulakov, Anton, Mark Zwolinski, and Jeff Reeve. "Faulttolerance in distributed neural computing." arXiv preprint arXiv:1509.09199 (2015). (Year: 2015).*

Anghel I., et al., "A Policy-Driven Self-Healing Algorithm for Context-Aware Systems." IEEE 5th International Conference on Intelligent Computer Communication and Processing, 2009, pp. 229-236.

Cardoso N., et al., "Self-Healing on the Cloud: State-of-the-art and Future Challenges," Eighth International Conference on the Quality of Information and Communications Technology, 2012, pp. 279-284.

Park J., et al., "Proactive Self-Healing System Based on Multi-Agent Technologies," Third ACIS International Conference on Software Engineering Research, Management and Applications (SERA'05), 2005, pp. 256-263.

* cited by examiner

| Potential Solutions | | Solution 1 27A | --- | Solution N-1 | Solution N 27N | |
|---|---|---|---|---|---|---|
| State Identifiers 21 | | Action -1 23A | --- | Action -M-1 | Action -M 23M | Visit Count 25 |
| State -1 | | Expected return for Action-1 at State-1 | --- | --- | --- | X |
| --- | | --- | --- | --- | --- | --- |
| State-n | | --- | --- | --- | Expected return for Action-1 at State-M | Y |

METHODS AND SYSTEMS FOR SELF-HEALING IN CONNECTED COMPUTING ENVIRONMENTS

CROSS-REFERENCE TO RELATED APPLICATIONS

This patent application claims priority of and is a continuation of U.S. patent application Ser. No. 17/011,372, filed on Sep. 3, 2020, the disclosure of which is incorporated herein by reference in its entirety.

TECHNICAL FIELD

The present disclosure relates to connected systems having a plurality of components, including hardware and software, and more particularly, to methods and systems for autonomous, self-healing systems used for detecting and solving problems associated with one or more components of the connected systems.

BACKGROUND

Connected systems, including data centers, networked storage systems, software defined storage systems, cloud-based systems and others are commonly used for computing, networking and storage needs. These connected systems use many components including hardware and software components for executing computing, networking and storage related tasks. The size of these connected systems continues to increase, especially since cloud-based technologies become common place. As the size of these connected systems increases so does the complexity to manage these systems. For example, due to the large number of components used by connected systems, it can be difficult to identify and fix problems that are encountered during runtime. It is also difficult to reproduce a problem and then efficiently provide a solution because connected systems use many inter-connected components.

Conventional testing techniques that use load/stress on components of connected systems are not enough because the tests are based on specific assumptions that may vary in real-time. Other techniques that attempt to fix problems in connected systems are not intelligent enough to learn and then self-heal components. Continuous efforts are being made to develop technology that can be used to efficiently train and deploy self-learning agents in connected systems to automatically provide solutions for problems encountered by one or more components.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 1G shows an example, of a learned data structure used by a reinforcement learning (RL) agent, according to one aspect of the present disclosure;

DETAILED DESCRIPTION

Figure 1A:
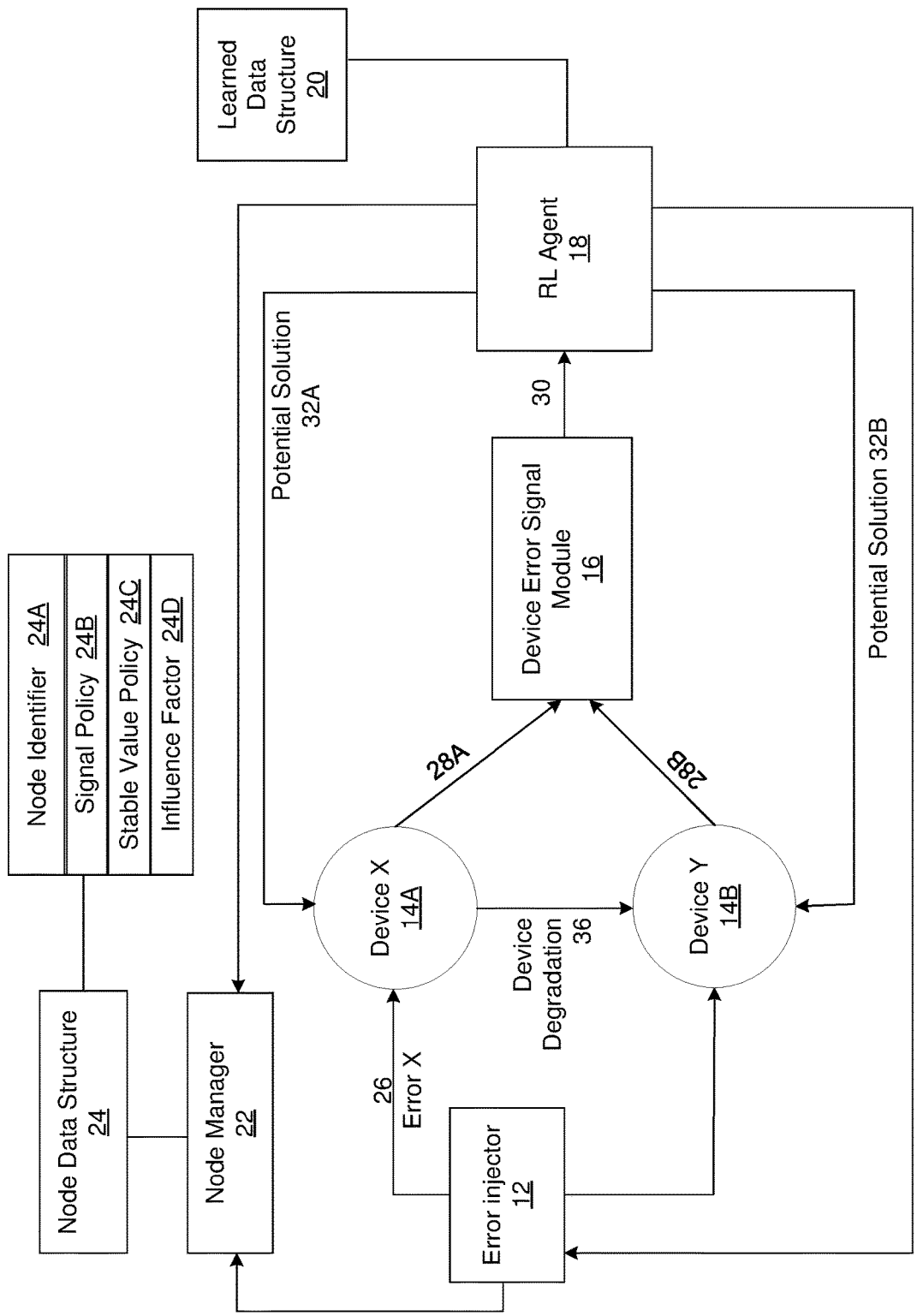
FIG. 1A shows an example of a self-healing system for self-healing one or more components of a connected system, according to one aspect of the present disclosure.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware-based processor, a hardware processor, an object, an executable, a library function, a thread of execution, a program or a portion thereof, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, the present disclosure provides novel computing technology that can "learn to fix" problems within a connected system including a networked storage system, software defined storage system or any other networked/distributed system type. The technology executes a simulation phase to train a reinforcement learning (RL) agent to learn about different problems that connected system components may encounter and test solutions to fix potential problems. The RL agent is deployed within the connected system, either at a central location or distributed among different components to detect, solve and learn how to fix problems.

In one aspect, the RL agent is deployed during runtime of a connected system having at least a first component and a second component. The RL agent detects a first degradation signal in response to an error associated with the first component and a second degradation signal from the second component, the second degradation signal generated in response to the error associated with the first component. The RL agent identifies from a learned data structure an action for fixing degradation, at both the first component and the second component; and continues to update the learned data structure, upon successful and unsuccessful attempts to fix degradation associated with the first component and the second component, respectively. Details of this innovative computing technology is provided below.

System 10: FIG. 1A shows an example of a system 10 for training a RL agent 18 to implement self-healing in a connected system, according to one aspect of the present disclosure. System 10 includes an error injector 12, a node manager 22, a device error signal module 16 (may also be referred to as module 16), and the RL agent 18. In one aspect, the error injector 12 and the RL agent 18 interface with the node manager 22 to obtain information regarding each node, as described below in detail. System 10 also include a node data structure 24 and a learned data structure 20 that are described below in detail.

The node manager 22 represents a connected system, e.g. graphically, using the node data structure 24. The node data structure 24 represents each resource of the connected system as a node within a graphical structure. Each graph edge is used to simulate the effect of a source node on a destination node i.e. a connected node.

In one aspect, the node data structure 24 identifies each node by a unique identifier 24A (e.g. a universal unique identifier), and stores a signal policy 24B, a stable value policy 24C and an influence factor 24D. The signal policy 24B indicates a severity of a degradation signal, e.g. if a node health indicator is less than X (e.g. 40%), then the signal may be considered minor; if the health signal is greater than Y (e.g. 60%), then the signal may be considered major; and a signal that reaches a value Z (e.g. 80%), then the signal may be considered an "emergency". The signal policy 24B may vary based on a component type.

The stable-value policy 24C provides guidance for triggering an action. An example of the stable-value-policy 24C is as follows:

| Value | Is stable | How it affects node health |
|---|---|---|
| 1-3 | Yes | Do Nothing |
| 5-6 | Yes | Upgrade Linearly |
| 4,7 | No | Degrade Exponentially |
| 8-9 | Yes | Do Nothing |

The influence factor 24D indicates the impact of deterioration at one component and a related component. In one aspect, the influence factor 24D is used as follows:
delta_h:=change of health of a node X, during a current time window;
For each node "n", the impact on an immediate neighbor node of X is determined by: n.health:=n.health+ delta_h*influence_factor_of_edge_x_to_n A simulation/training phase begins with the error injector 12 selecting a component (or element) of a connected system, e.g. device X 14A. The error injector 12 injects an error (e.g. 26) associated with device X 14A. The error 26 defines a new condition or state for device X 14A. The error 26 may also induce degradation 36 to a connected device (e.g. device Y 14B). The induced degradation 36 depends on the influence factor 24D. Based on the signal policy 24B and the stable value policy 24C, for device 14A and 14B, respectively, signals 28A and 28B are generated and provided to module 16. Module 16 then generates a signal (or alarm) 30 for the RL agent 18 The RL agent 18 receives the signal 30 and uses the learned data structure 20 (may also be referred to as "data structure 20") to find a potential solution for the degradation in devices X 14A and device Y 14B. It is noteworthy that signal 30 may be a "stream of signals" i.e. signal 30 includes signal 28A, followed by signal 28B and then followed by other signals.

An example of data structure 20 is shown in FIG. 1G. Data structure 20 maintains potential solutions 27A-27N for different states/conditions identified by unique state identifiers 21. Each solution may have one or more actions 23A-23M. Data structure 20 may also store the number of times a state has been visited, shown as "visit count 25." It is noteworthy that data structure 20 of FIG. 1G is shown as an example, and maybe split into multiple data structures. For example, the visit count 25 for each state may be a separate data structure. The adaptive aspects described herein are not limited to any specific number of data structures or a layout of data structure 20. The use of data structure 20 is described below in detail.

The RL agent 18 selects a potential solution 32A and 32B from the data structure 20, based on signal 30. If solution 32A, 32B or both 32A and 32B are successful, signal 30 is disabled and the data structure 20 is updated to indicate that solutions 32A/32B were successful. This enables the RL agent 18 to apply solutions 32A and 32B for error 26. If the solution is unsuccessful, then the RL agent 20 continues to apply different solutions until the problem is fixed.

Once the RL agent 18 is trained, it is deployed in a runtime environment, as described below in detail. During runtime i.e. when the connected system is operational, the RL agent 18 heals components in the connected system and continues to learn solutions that result in solving problems as well as solutions that may not be effective. The data structure 20 is continuously updated to improve self-healing, as described below in detail.

Figure 1B:
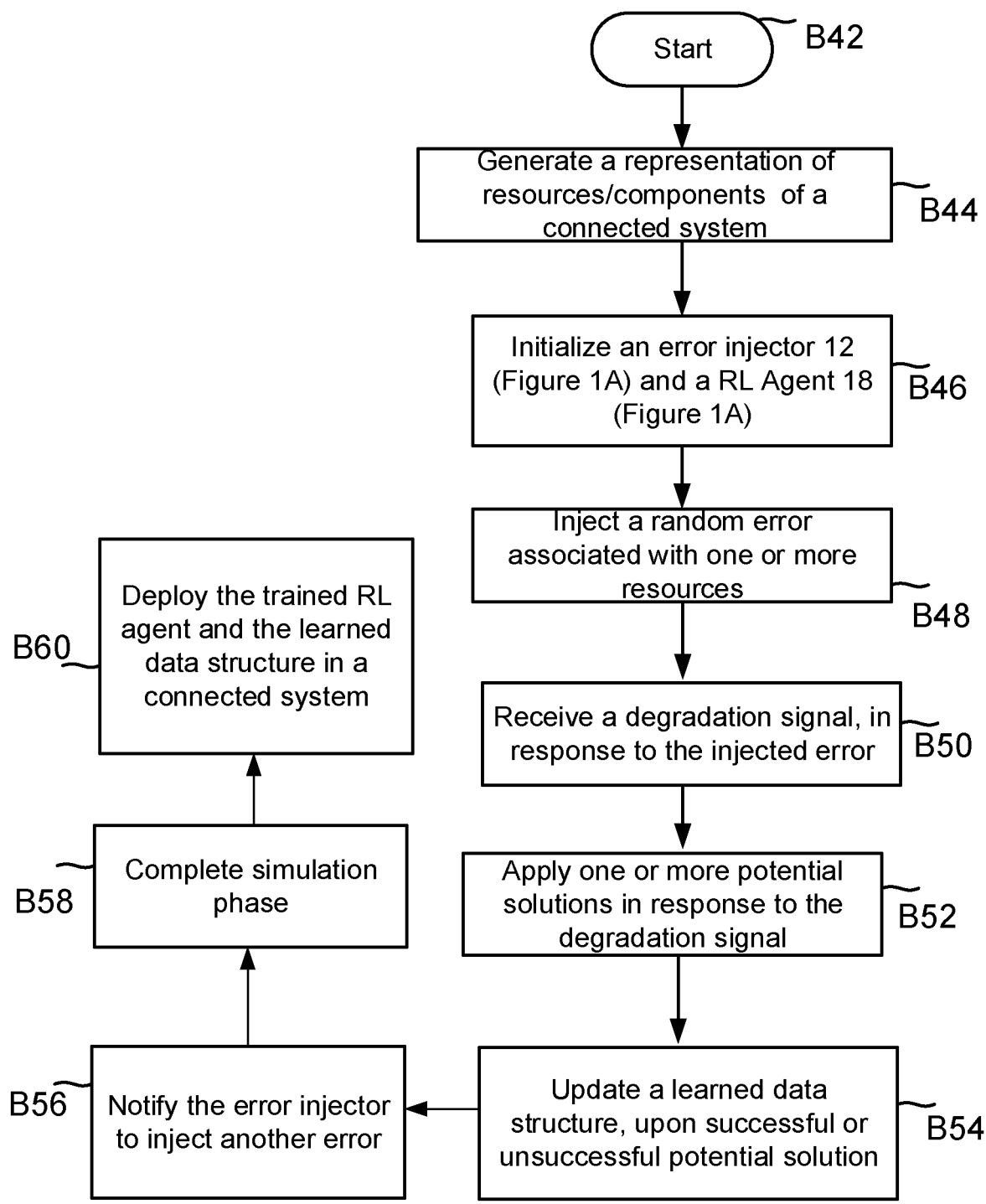
FIG. 1B shows a process for executing a simulation phase for training an agent to implement self-healing in the connected system, according to one aspect of the present disclosure.

Process Flows: FIG. 1B shows a process 40 for training the RL agent 18 during a simulation phase, according to one aspect of the present disclosure. The process blocks of process 40 are executed by a hardware-based processor, executing instructions out a memory device. The instructions improve the ability of a computing system to generate and train the RL agent 18 to self-heal potential problems and/or actual problems that are encountered while the connected system is operational during runtime.

Process 40 begins in block B42, when a computing device (or a virtual machine) for the simulation phase is powered and initialized. In block B44, the node manager 22 generates a representation of a connected system. The representation may be a graphical tree, where each node represents a resource or component of the connected system. The resource includes hardware components (e.g. processors, storage devices, network interface cards, storage adapters, storage controllers, storage servers, or any other hardware device), software (e.g. applications, operating systems, application programming interface (API), drivers, firmware instructions for embedded systems, virtual machine, guest operating system of a virtual machine or any other software type) or any other component type. Details of block B44 are provided below with respect to FIG. 1C.

In block B46, the error injector 12 and the RL agent 18 are initialized. Details of process block B46 are provided below with respect to FIG. 1D.

In block B48, the error injector 12 injects a random error 26 associated with device X 14A, as shown in FIG. 1A. The error 26 may also introduce degradation in device Y 14B, shown as 36 in FIG. 1A. The degradation 36 depends on the influence factor 24D.

In block B50, signals 28A and 28B are sent to module 16, based on the signal policy 24B and the stable value policy 24C. Thereafter, signal 30 is sent to the RL agent 18.

In block B52, the RL agent 18 applies a solution, e.g. 32A for device X 14A and solution 32B for device Y 14B, as shown in FIG. 1A. If the solutions fail, then RL agent 18 selects another solution for solving the degradation due to error 26.

To select an action, the RL agent 18 maintains a state (21, FIG. 1G) and associated actions (23A-23M, FIG. 1G) with an expected return at the data structure 20. For each state, the RL agent 18 selects an action based on selecting either an exploration or exploitation strategy, as described below:

(a) Assume that the probability of selecting the exploration strategy=ε The exploration strategy involves selecting one of the actions 23A-23M such that each action has an equal chance of being selected.

(b) Assume that the probability of selecting exploitation=1−ε The exploitation strategy involves selecting an action from 23A-23M that has a maximum expected reward.

(c) In one aspect, the following exponential decay function for F, provides an optimal result during simulation: $\varepsilon = e^{-0.2k}$ where k=number of times a state has been visited, i.e. the visit count 25, of FIG. 1G, retrieved from data structure 20.

After a successful solution/action, the data structure 20 is updated in block B54. The update includes adding indication for failed solutions and the successful solutions for both devices 14A and 14B.

In another aspect, an entry (maybe referred to as "a Q-Value" (also referred to as "Q-val") in data structure 20 is updated (i.e. an old-Q-val is replaced by a new-Q-val) corresponding to a last state, based on the following:

new-$Q$-val=old-$Q$-val+$a$[reward+($\gamma$*maxValue)−old-$Q$-val]

It is noteworthy that Q-val is a term used in reinforcement learning to provide an estimate of an "expected return" for a state, when an action is taken.

α is a fraction to control an overall learning rate, and as an example, maybe 0.1 or any other value.

"maxValue" is a maximum expected return that a current state promises (i.e. the maximum value for a data structure 20 entry among all cells of a row corresponding to a current state in data structure 20)

γ controls a discount factor, i.e. how much of a future return is expected for taking an action. As an example, γ may be 0.8.

"Reward" is determined by a policy. For example, a reward maybe a numerical value of 5, if an issue is resolved based on a last state that had an active degradation signal, and a current state is free from an active degradation signal. The reward maybe equal to a numerical value of 1, if a problem is not solved but the overall situation is better, e.g. a current state has fewer number of active degradation signals or signals of lesser severity by the last action. Furthermore, a reward of −1 may indicate that a situation has worsened since a last action. It is noteworthy that these are simply examples to illustrate "reward", other techniques may be used to indicate different reward levels. It is noteworthy that the adaptive aspects of the present disclosure are not limited to representing the reward numerically.

Thereafter, in block B56, the error injector 12 is notified to inject another error, if the simulation phase is not complete. The number and type of injected errors vary based on the connected system, e.g. a data center having numerous storage servers configured into multiple clusters may use more injected errors and error types than a dual node, storage system with two storage servers.

In block B58, the simulation phase is completed after all the potential errors have been injected and potential solutions have been applied. In block B60, the trained RL agent 18 with the data structure 20 is deployed in a connected system for runtime i.e. when the connected system is operating, as described below with respect to FIG. 1E.

Figure 1C:
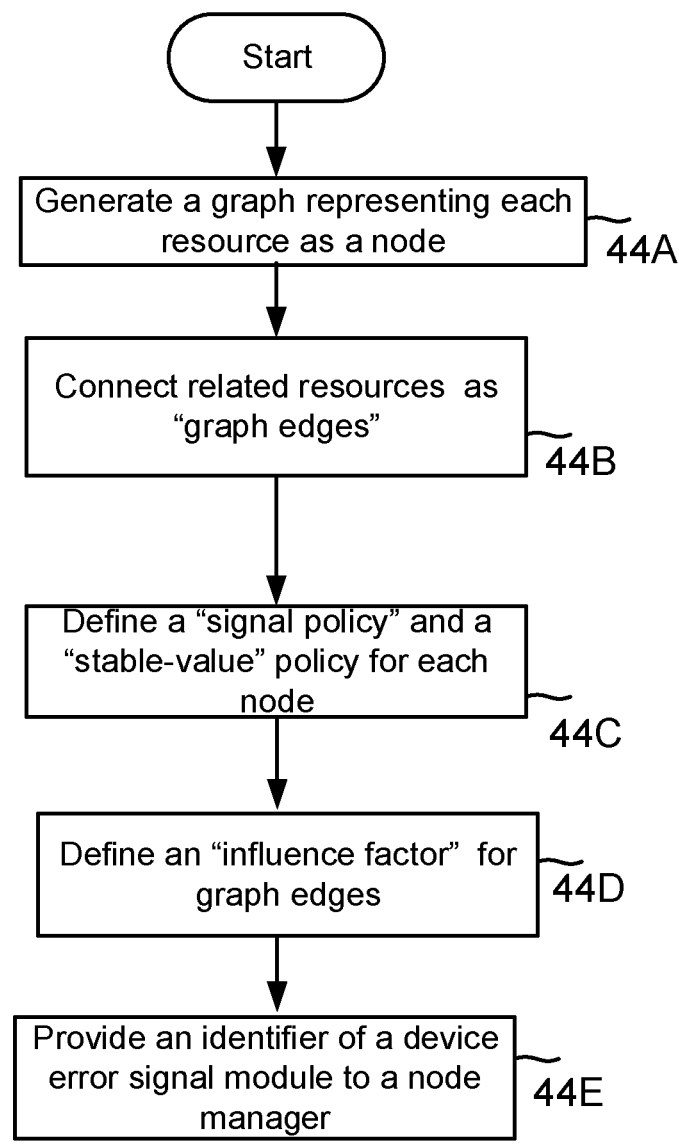
FIG. 1C shows an initialization process for the simulation phase, according to one aspect of the present disclosure.

FIG. 1C shows details of block B44 of FIG. 1B, according to one aspect of the present disclosure. In one aspect, in block 44A, a graph representing each resource as a node is generated by the node manager 22. Each node may represent or simulate a function (e.g. a server function or a software function, a micro-service provided by cloud-based systems), a hardware component, an application, or any other component. The various nodes are connected by graph edges in block 44B. The signal policy 24B and the stable-value policy 24C are defined in block 44C. An influence factor 24D is also defined for graph edges in block 44D.

In block 44E, the node manager 22 obtains a unique identifier (e.g. IP (Internet Protocol) address) of module 16. This enables the node manager 22 to interface with module 16. Thereafter, node data structure 24 is generated. It is noteworthy that node data 24 may be implemented by multiple structures, for example, there may be a separate node data structure 24 for each component.

Figure 1D:
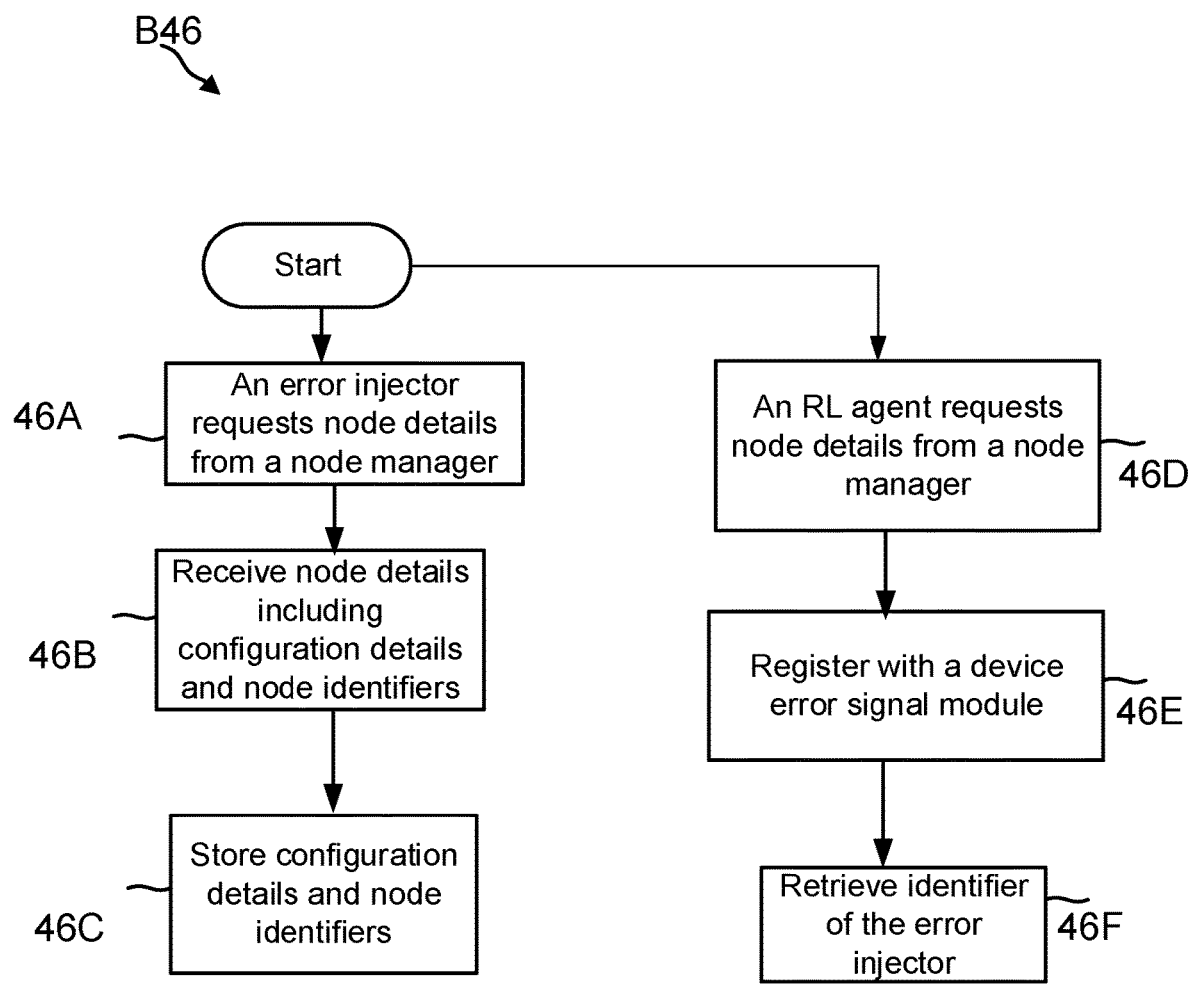
FIG. 1D shows another initialization process for the simulation phase, according to one aspect of the present disclosure.

FIG. 1D shows details of block B46 of FIG. 1B, according to one aspect of the present disclosure. Blocks 46A-46C illustrate initialization of the error injector 12, while blocks 46D-46F illustrate initialization of the RL agent 18.

In block 46A, the error injector 12 requests node details from node manager 22. The node details are retrieved from the node data structure 24 and received by the error injector 12 in block 46B. The node details include configuration information for different components and unique identifiers. In block 46C, the retrieved information is stored at a storage location.

In block 46D, the RL agent 18 requests node information from node manager 22, like the information in 46B. In block 46E, the RL agent 18 registers itself with module 16 so it can receive signal 30 (FIG. 1B). Thereafter, in block 46F, the RL agent 18 retrieves an identifier of the error injector 12.

In one aspect, a method is provided. The method includes injecting an error (e.g. 26, FIG. 1A) associated with a first device (e.g. 14A, FIG. 1A) of a networked system during a simulation phase, the error impacting the first device and a second device (e.g. 14B, FIG. 1A) of the networked system; generating a first indicator (e.g. 28A, FIG. 1A), indicating degradation in the first device, and a second indicator (e.g. 28B, FIG. 1A) indicating degradation in the second device; automatically triggering a potential solution (e.g. 32A/32B, FIG. 1A) to the injected error for the first device and the second device, during the simulation phase; upon successful execution of the potential solution, updating a data structure (e.g. 20, FIG. 1A) to store the potential solution for the injected error; and deploying the data structure for self-healing the first device and the second device, upon detection of an error like the injected error, during runtime of the networked system.

Figure 1E:
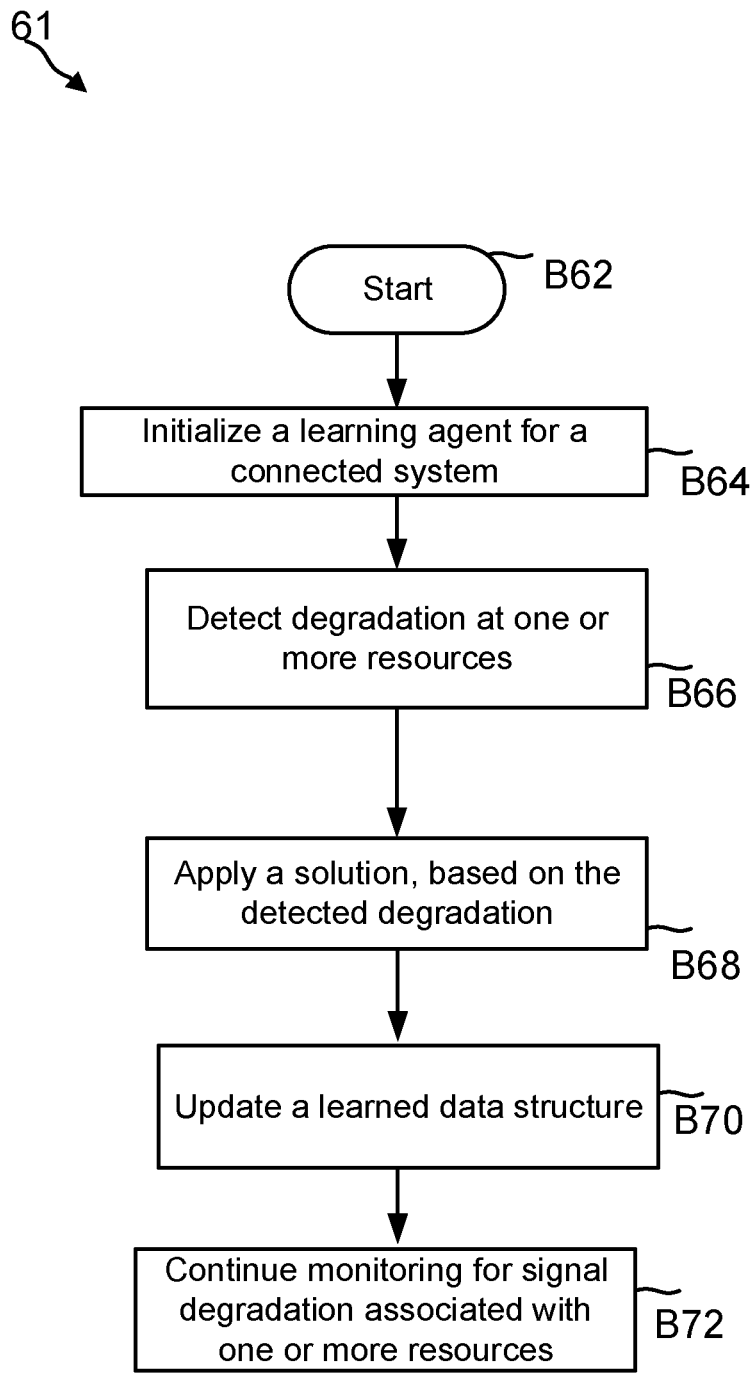
FIG. 1E shows a process for detecting and solving a problem in a connected system during runtime, according to one aspect of the present disclosure.

FIG. 1E shows process 61 for using the RL agent 18 and the data structure 20 during run time, according to one aspect of the present disclosure. The process begins in block B62, after the RL agent 18 is trained during the simulation phase described above with respect to FIG. 1B.

In block B64, the RL agent 18 is initialized within a connected system. The RL agent 18 may operate as a separate component or is integrated with another application, for example, a management application.

In block B66, a degradation signal associated with one or more components is received by the RL agent 18. The severity of the degradation is based on the stable-value policy 24C associated with one or more components.

In block B68, the RL agent 18 obtains a solution from the data structure 20. The solution is applied to one or more components. If the solution fails, then another solution is selected. Thereafter, data structure 20 is updated, as described above with respect to block B54 of FIG. 1B. The RL agent 18 continues to monitor the various components of the connected system in block B72, and blocks B68-B70 are repeated when another degradation signal is detected in block B66.

Figure 1F:
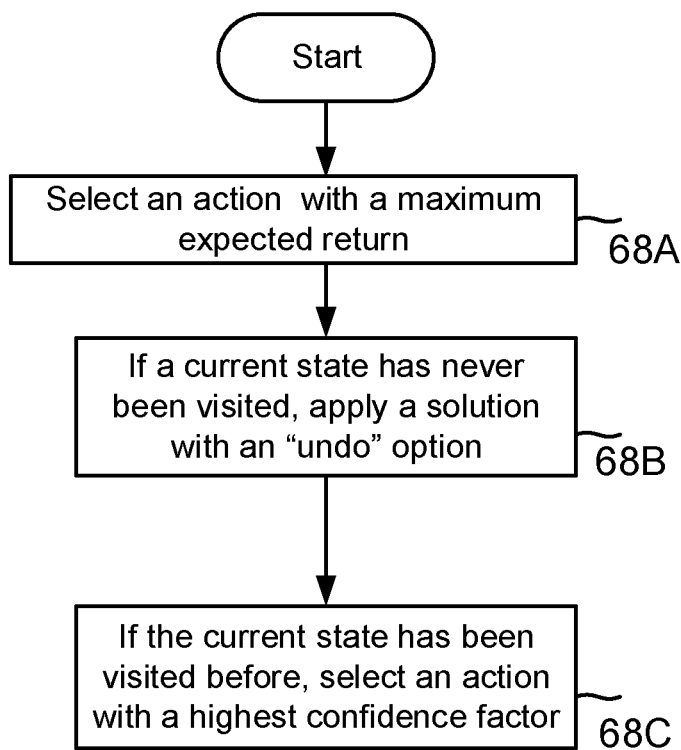
FIG. 1F shows a process for sub-block B68 of FIG. 1E, according to one aspect of the present disclosure.

FIG. 1F shows details of block B68, according to one aspect of the present disclosure. In block 68A, an action from data structure 20 with a maximum expected return is selected. If the current state has never been visited, then in block 68B a solution is applied with an "undo" option, since there may not be any historical evidence regarding the effectiveness of the selected solution.

If the current state has been visited, then the action with a highest confidence factor is selected in block 68C.

In one aspect, a non-transitory machine-readable storage medium having stored thereon instructions for performing a method, comprising machine executable code is provided. The code when executed by at least one machine, causes the machine to: deploy a RL agent (e.g. 18, FIG. 1A) during runtime of a networked system having at least a first component and a second component; detect a first degradation signal in response to an error associated with the first component, and a second degradation signal associated with the second component, the second degradation signal generated in response to the error; identify, by the RL agent, from a learned data structure an action for fixing degradation at both the first component and the second component; and continue to update the learned data structure by the RL agent, upon successful and unsuccessful attempts to fix degradation associated with the first component and the second component.

Figure 1H:
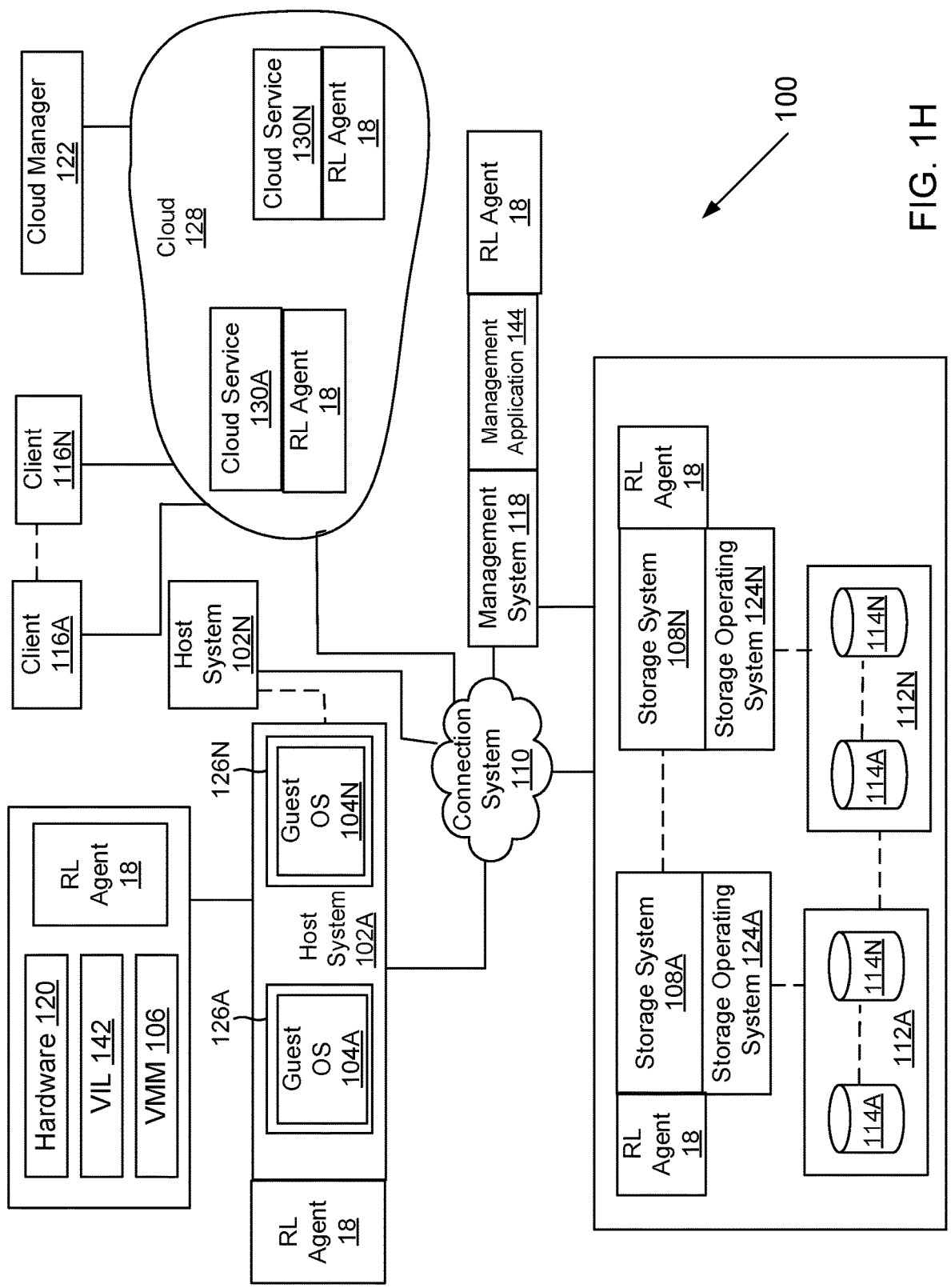
FIG. 1H shows an example of an operating environment for the various aspects of the present disclosure.

System 100: FIG. 1H shows an example of a system 100, having a cloud-based environment (or "cloud") 128 and deploying the RL agent 18 with access to data structure 20, according to one aspect of the present disclosure. The term "cloud" refers to using a network, for example, the Internet, to access shared resources, on-demand, like a public utility. The RL Agent 18, described above in detail, is associated with one or more cloud services 130A-130N (may also be referred to as a "micro-service 130" or micro-services 130) to self-heal one or more components within cloud 128 as well as components outside of cloud 128 in system 100.

Cloud 128 provides an abstraction between computing/ storage resources and its underlying technical architecture (e.g., servers, storage systems, networks and others), enabling convenient, on-demand access to a shared pool of configurable resources that can be rapidly provisioned and released with minimal management effort or service provider interaction. Cloud 128 uses a layered approach for providing access to resources. A first layer is an application layer that is executed at client computing devices to enable clients to access resources (e.g. storage). After the application layer, is a cloud platform and cloud infrastructure, followed by a "server" layer that includes hardware and computer software designed for specific services.

In one aspect, a cloud manager system 122 manages access to cloud based services 130 for client devices (or "clients") 116A-116N that can access one or more micro-service 130. Each micro-service 130 may include a User Interface (UI), an application programming interface ("API") and a data store specifically configured for a specific micro-service. The term micro-service as used herein denotes computing technology for providing a specific functionality in a networked storage environment. As an example, a micro-service may provide analytic information to clients 116 regarding data stored by system 100, and performance and utilization of resources used by system 100.

System 100 also includes a plurality of storage systems 108 (e.g. 108A-108N) that may be used at one or more physical sites. A management system 118 executes a management application 144 to interface with various storage systems 108A-108N and collects performance data from the various resources. The collected data is processed by the management system 118 and may be stored at a data warehouse. RL agent 18 may be executed by the management system 118 or is integrated with the management application 144. The RL agent 18 and the data structure 20, when deployed with the management system 118 can detect problems associated with the management system 118 and self-heal those problems. The problems without limitation maybe associated with the hardware and/or software used by the management system 118.

In one aspect, system 100 may include a plurality of computing systems 102A-102N (may also be referred to as host platform(s)/system(s) 102 or simply as server(s) 102) communicably coupled to storage systems 108, each executing a storage operating system 124 (shown as 124A-124N), via a connection system 110 such as a local area network (LAN), wide area network (WAN), the Internet and others. As described herein, the term "communicably coupled" may refer to a direct connection, a network connection, or other connections to enable communication between devices. It is noteworthy that although connection system 110 and cloud 128 are shown as separate entities, functionally, the two systems may be similar in terms of providing access to host systems i.e. the host systems may access the storage systems via cloud 128.

Host system 102A may include a VM environment to execute a plurality of VMs 126A-126N (also referred to as VM or VMs 126) that are presented to client computing devices/systems 116A-116N. In one aspect, RL agent 18 is executed by host 102A for self-healing, as described above in detail. The RL agent 18 may be executed within one or more VMs.

VMs 126A-126N execute a plurality of guest OS 104A-104N (may also be referred to as guest OS 104) that share hardware resources 120. Typically, in a virtual machine environment a physical resource is time-shared among a plurality of independently operating processor executable VMs. Each VM 126 may function as a self-contained platform, running its own operating system (OS) and computer executable, application software. The computer executable instructions running in a VM maybe collectively referred to herein as "guest software" (shown as guest OS 104A-104N). In addition, resources available within the VM may be referred to as "guest resources."

The guest software expects to operate as if it were running on a dedicated computer rather than in a VM. That is, the guest software expects to control various events and have access to hardware resources 120 on a physical computing system (may also be referred to as a host platform/system). The hardware resource 120 may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, host system 102A includes or interfaces with a virtual machine monitor (VMM) 106, for example, a processor executed Hyper-V layer provided by Microsoft Corporation of Redmond, Wash. (without derogation of any third party trademark rights), a hypervisor layer provided by VMWare Inc. (without derogation of any third party trademark rights), or any other type. VMM 106 manages the plurality of guest OS 104A-104N executed by the host system 102A. The VMM 106 may include or interface with a virtualization layer (VIL) 142 that provides one or more virtualized hardware resource 120 to each OS 104A-104N.

In one aspect, VMM 106 is executed by the host system 102A. In another aspect, VMM 106 may be executed by an independent stand-alone computing system, often referred to as a hypervisor server or VMM server and VMs 126A-126N are presented at another one or more computing systems.

RL agent 18 is configured to interface with VMM 106, VIL 142 and hardware 120 for detecting problems or potential problems, and then self-healing using the data structure 20, as described above in detail.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1H may be customized depending on the virtual environment to implement the aspects of the present disclosure. Furthermore, VMM 106 (or VIL 142) may execute other modules, for example, a storage driver, network interface and others, the details of which are not germane to the aspects described herein and hence have not been described in detail.

In one aspect, the management system 118 may also be used for managing and configuring various elements of system 100. Application 144 may be used to manage and configure VMs as well as configure resources that are used by VMs, according to one aspect. It is noteworthy that although a single management system 118 is shown in FIG. 1, system 100 may include other management devices for performing different functions, for example, managing storage systems, managing network connections and other functions. The innovative aspects described herein are not limited to any specific number of management systems.

In one aspect, storage system 108 has access to a set of mass storage devices 114A-114N (may also be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any storage device type or storage device configuration.

In one aspect, the storage system 108 provides a set of logical storage volumes (or logical unit numbers (LUNs) for a storage area network (SAN)) for storing and retrieving data. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all the storage space in multiple storage devices, a RAID group, or any other suitable set of storage space.

The storage operating system 124 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on client requests. The requests may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP). The adaptive aspects described herein are not limited to any specific request type or request protocol.

In a typical mode of operation, a client (for example, a VM) transmits one or more input/output (I/O) requests, such as a CFS or NFS request, over connection system 110 to the storage system 108. Storage system 108 receives the requests, and issues one or more I/O commands to storage devices 114 to read or write the data on behalf of the client system and issues a CIFS or NFS response containing the requested data over the network 110 to the respective client system.

RL agent 18 interfaces with the various components of storage system 108, including the storage operating system 124, storage devices 114 and other components. The self-healing technology disclosed above may be used to automatically solve problems associated with any component of storage system 108 using data structure 20.

Although storage system 108 is shown as a stand-alone system, i.e. a non-cluster based system, in another aspect, storage system 108 may have a distributed architecture; for example, a cluster based system that is described below in detail with respect to FIGS. 2-3.

Clustered System: FIG. 2 shows a cluster based storage environment 200 having a plurality of nodes for managing storage devices and providing micro-services via a cloud computing environment, managed by a cloud manager 220 (similar to 122, FIG. 1H), according to one aspect. Storage environment 200 may include a plurality of client systems 204.1-204.N (similar to 116A-116N), a clustered storage system 202 (similar to storage system 108), management system 118 and at least a network 206 communicably connecting the client systems 204.1-204.N and the clustered storage system 202. The cloud manager 220 interfaces with clients and the storage systems via a network connection.

The clustered storage system 202 includes a plurality of nodes 208.1-208.3, a cluster switching fabric 210, and a plurality of mass storage devices 212.1-212.3 (may also be referred to as 212 and similar to storage device 114).

RL agent 18 with data structure 20 may be deployed at numerous locations, including the nodes within the clustered system 202. In one aspect, RL agent 18 detects and self-heals problems associated within the clustered system 202, using the innovative technology described above.

Each of the plurality of nodes 208.1-208.3 is configured to include a network module (N-module), a storage module (a D-module), and a management module (M-module), each of which can be implemented as a processor executable module. As an example, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N over the computer network 206. The N-modules handle file network protocol processing (for example, CFS, NFS and/or iSCSI requests). The D-modules 216.1-216.3 connect to one or more of the storage devices 212.1-212.3 and process input/output (I/O) requests. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 collect information regarding storage devices 212 and makes it available management system 118. The information may include latency information, capacity utilization, available performance capacity data or any other information.

A switched virtualization layer including a plurality of virtual interfaces (VIFs) 219 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (may also be referred to as "VServers" or virtual storage machines), in which each VServer represents a single storage system namespace with separate network access. Each VServer has a specific client domain and a security domain that are separate from the client and security domains of other VServers. Moreover, each VServer is associated with one or more VIFs 219 and can span one or more physical nodes, each of which can hold one or more VIFs and storage associated with one or more VServers. Client systems 204 can access the data on a VServer from any node of the clustered system, through the VIFs associated with that VServer. It is noteworthy that the aspects described herein are not limited to the use of VServers.

Each of the nodes 208.1-208.3 is defined as a computing system to provide application services to one or more of the client systems 204.1-204.N. The nodes 208.1-208.3 are interconnected by the switching fabric 210, which, for example, may be embodied as an Ethernet switch or any other type of switch/connecting device.

Figure 2:
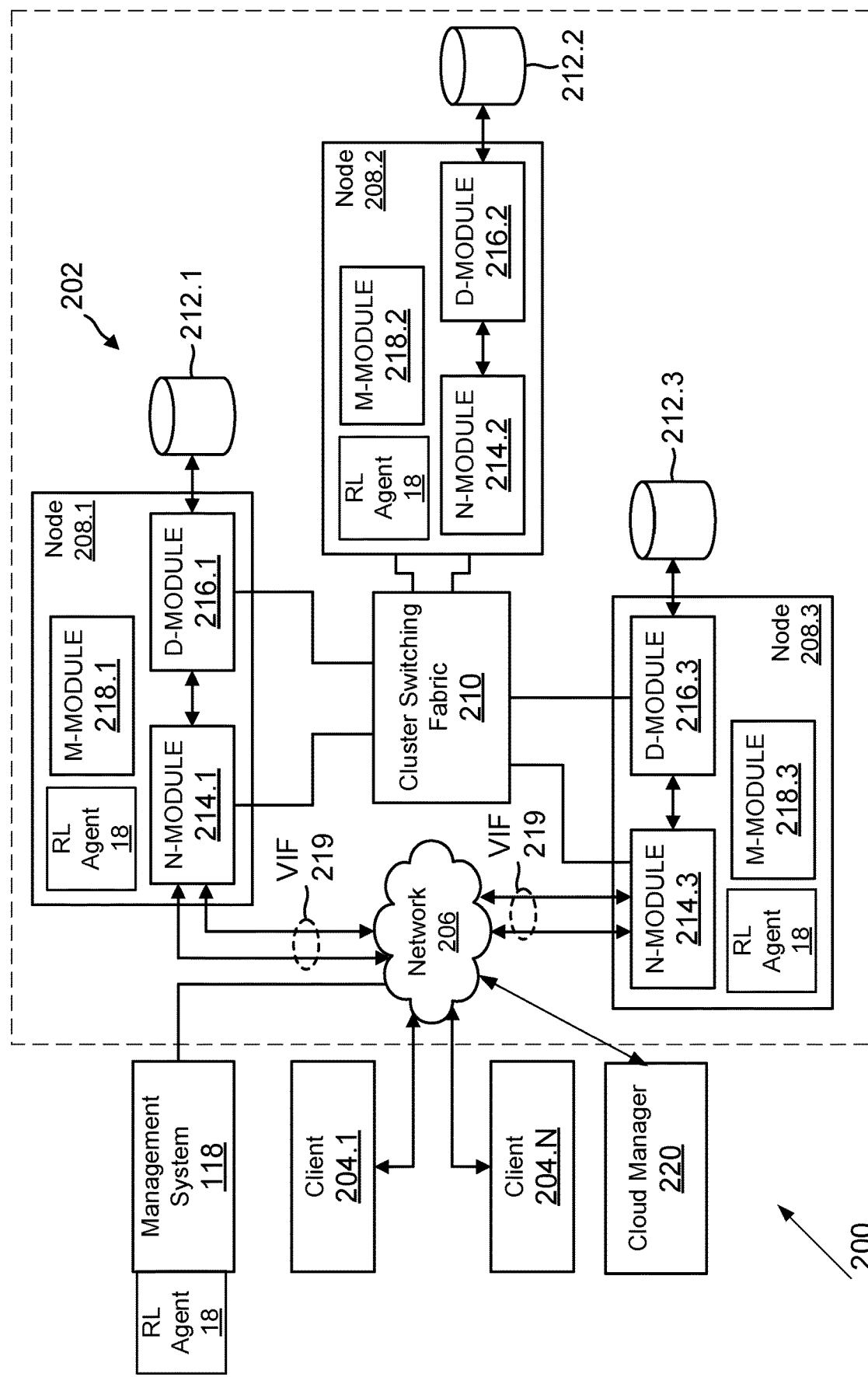
FIG. 2 shows an example of a networked, clustered storage system using a RL agent, according to one aspect of the present disclosure.
Figure 3:
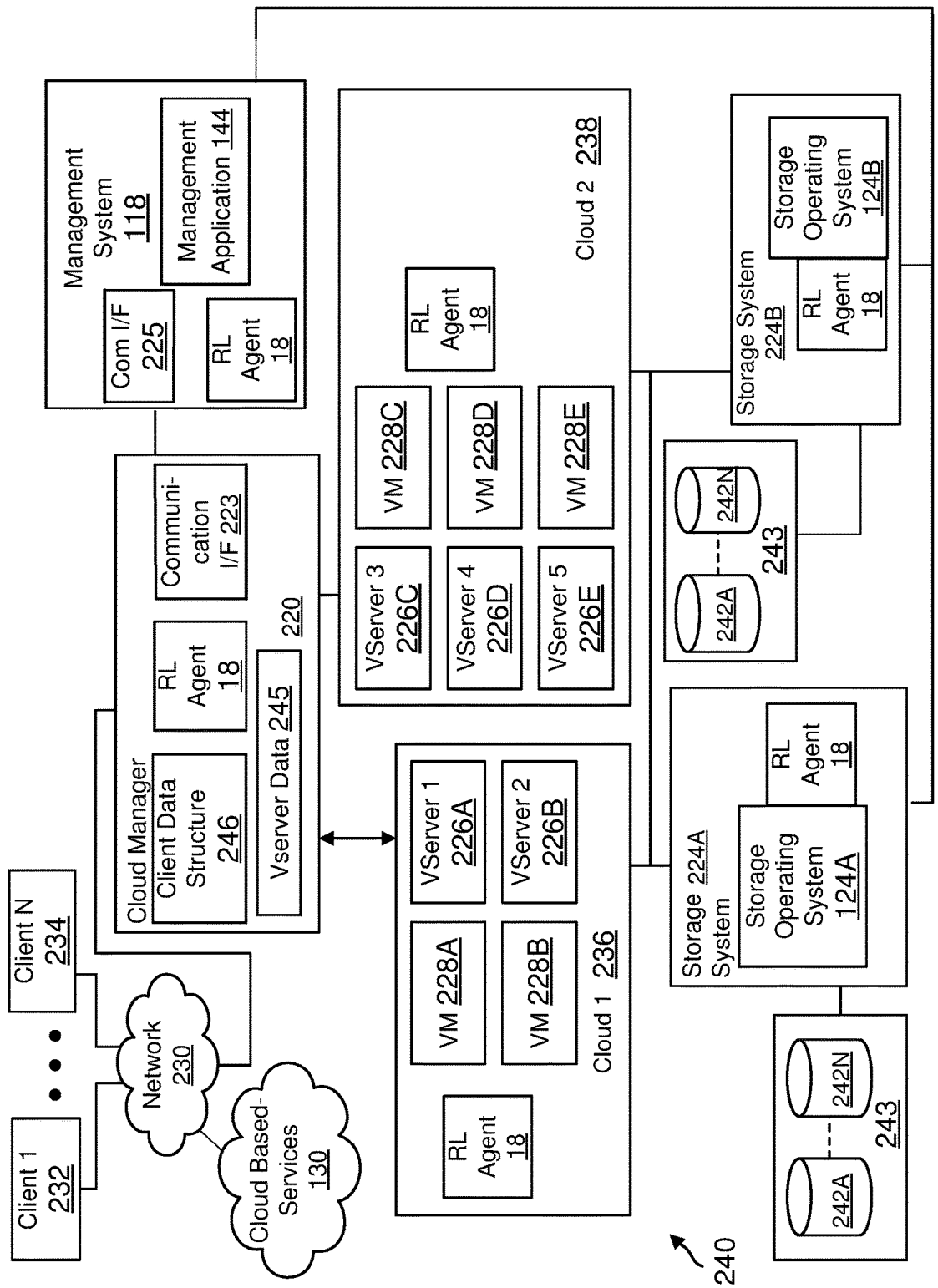
FIG. 3 shows an example of a networked storage system in a cloud computing environment using a RL agent, according to one aspect of the present disclosure.

Although FIG. 2 depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules. In another aspect, the clustered storage system 202 may only include one N-module and D-module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Cloud Environment: FIG. 3 shows one or more storage systems (224A/224B) analogous to storage system 108/202 for providing storage services in a cloud-based environment 240 (similar to 128, FIG. 1H), according to one aspect of the present disclosure. In one aspect, cloud environment 240 may be a computing environment configured to enable network access (e.g., on-demand access) to a shared pool of configurable computing resources (e.g., networks, storage, host servers, applications, and services). The cloud environment 240 also provided micro-services 130 to client systems, as described above with respect to FIG. 1H. In one or more aspects, a storage system may be a hardware resource configured to host one or more VServers in the cloud environment 240.

Storage system 224A and storage system 224B may be deployed by the cloud manager 220 (similar to 122, FIG. 1H) and/or a cloud administrator configured to provision the host systems, storage associated with one or more client devices (e.g., client 1 232, client N 234) and/or services requested by the one or more client devices based on various policies that are customized for different clients and applications. As an example, storage system 224A may be associated with VServer 1 226A and VServer 3 226C, while storage system 224B may be associated with VServer 2 226B, VServer 4 226D and VServer 5 226E.

In one or more aspects, cloud manager 220 may enable one or more client devices to provision computing resources thereof. The cloud manager 220 may manage cloud portion(s) (e.g., cloud 1 236, cloud 2 238) associated with client 1 232 and client N 234, respectively. It is noteworthy that client 1 232 and/or client N 234 may be entities (e.g., corporations, departments and others), and there may be several computing devices associated with each of client 1 232 and/or client N 234. The cloud manager 220 also communicates with the management system 118 using communication interface 223, while the management system 118 uses communication interface 225.

In one aspect, RL agent 18 with data structure 20 may be deployed within cloud 236 and 238, and storage systems 224A/224B, respectively for detecting problems and implementing the self-healing technology, described herein.

In one aspect, the cloud manager 220 maintains client information using a client data structure 246. The client data structure 246 identifies a client and the various services that are available for client systems. The cloud manager 220 also maintains VServer data 245 includes a listing of VServers that are assigned to each client/VM. It is noteworthy that each cloud may have its own storage administrator that may store VServer data 245. The various aspects described herein are not limited to which entity maintains and updates VServer data.

In one aspect, the RL agent 18 with data structure 20 may be implemented at the cloud manager 220 for resolving any problems that arise with respect to clients 232/234 accessing storage at the storage systems 224A/224B. The RL agent 18 uses the self-healing technology described above in detail.

As an example, client 1 232 and/or client N 234 may log into a system associated with cloud manager 220 to access cloud 1 236 and/or cloud 2 238 (and the VMs 228A-228E therein) through a public network 230 (e.g., Internet). The client devices and/or VMs associated therewith provided in cloud environment 240 may be analogous to the clients of FIGS. 1/2.

In order to address storage requirements/requests associated with client 1 232 and client N 234, cloud manager 220 may be configured to appropriately provision VServer 1 226A, VServer 2 226B, VServer 3 226C, VServer 4 226D and VServer 5 226E and then allocate the appropriate VServer to client 1 232 and client N 234. The VServers may be virtualized entities utilized by client 1 232 and client N 234 to meet storage requirements thereof. Multi-tenancy may allow for a storage system to have multiple VServers associated therewith. A portion of the cloud (e.g., cloud 1 236) including VServer 1 226A, VServer 2 226B and virtual machines (e.g., VM 228A, VM 228B) associated therewith, may be associated with client 1 232, and a portion of the cloud (e.g., cloud 2 238) including VServer 3 226C, VServer 4 226D and VServer 5 226E and VMs (e.g., VM 228C, VM 228D, VM 228E) associated therewith, may be associated with client N 234.

Cloud 1 236 and/or cloud 2 238 may span across several geographic regions. In one or more aspects, the cloud portions may span multiple countries under differing jurisdictional guidelines. For example, a jurisdictional guideline may deem that a VServer needs to be launched on hardware (e.g., storage system) located in the same jurisdiction as the corresponding client(s).

In one or more aspects, administrators of cloud environment 240 may possess the authority to launch one or more VServers on any of storage system 224A and storage system 224B, irrespective of the location(s) thereof. An administrator may also modify the version of the storage operating system and/or configuration settings on storage system 224A and/or storage system 224B. In another example, an administrator may provision a VServer on a storage system offering lower performance and/or located in a geographic region different from that of a client device.

RL agent 18 with data structure 20, when trained and enabled provides support for processing client requests associated with one or more VServers in cloud 236 and 238, using the self-healing technology described above. Furthermore, RL agent 18 may also be deployed within storage systems 224A/224B, as described above.

Figure 4:
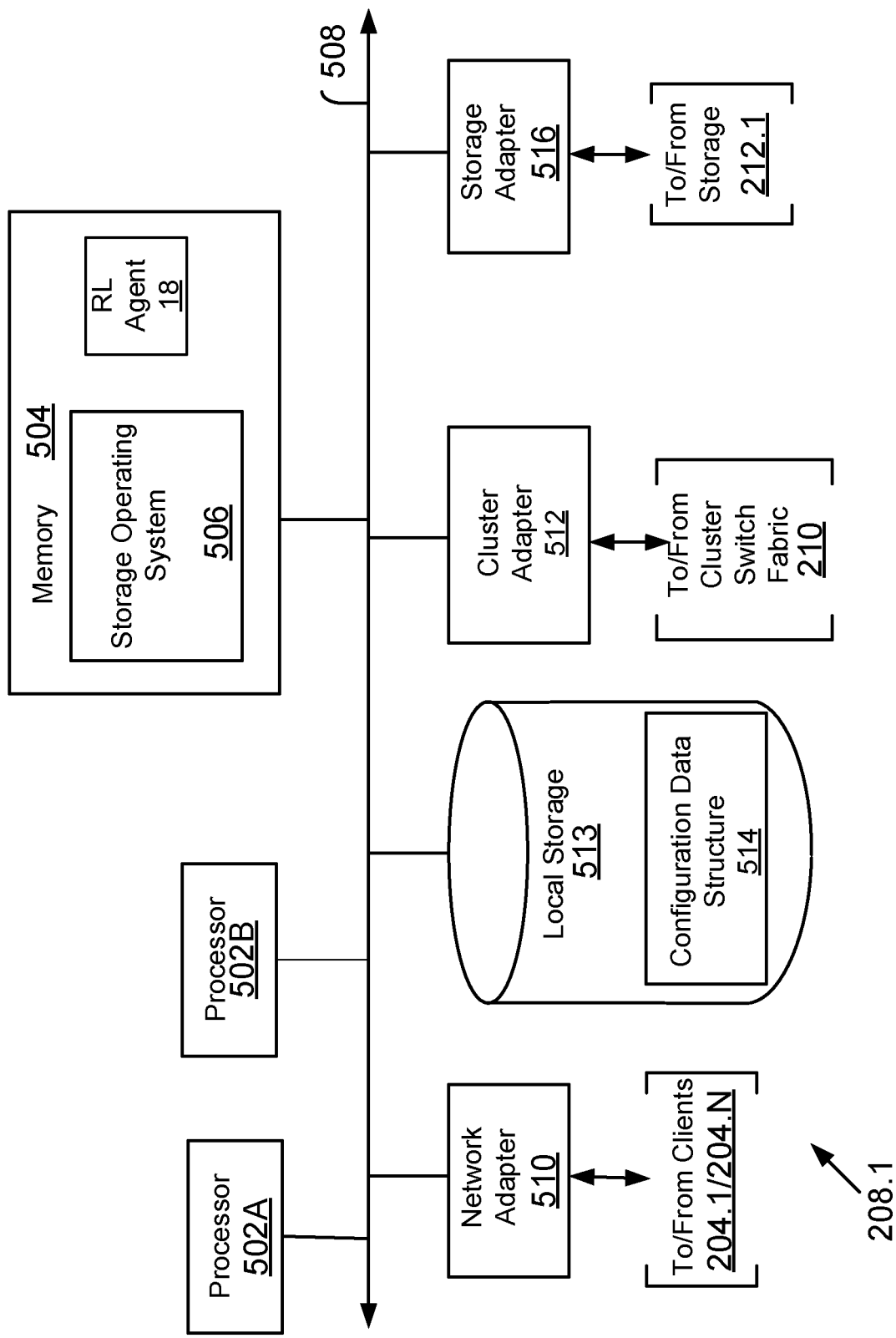
FIG. 4 shows an example of storage system node using a RL agent, according to one aspect of the present disclosure.

Storage System Node 208.1: FIG. 4 is a block diagram of a node 208.1 that is illustratively embodied as a storage system comprising of a plurality of processors 502A and 502B, a memory 504, a network adapter 510, a cluster access adapter 512, a storage adapter 516 and local storage 513 interconnected by a system bus 508.

Processors 502A-502B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 513 comprises one or more storage devices utilized by the node to locally store configuration information for example, in a configuration data structure 514.

The cluster access adapter 512 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 512 is utilized by the N/D-module for communicating with other N/D-modules in the cluster 100.

Each node 208.1 is illustratively embodied as a dual processor storage system executing a storage operating system 506 (similar to 124, FIG. 1H) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 502A executes the functions of the N-module 104 on the node, while the other processor 502B executes the functions of the D-module 106.

The memory 504 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 506 portions of which is typically resident in memory and executed by the processing elements, functionally organizes the node 208.1 by, inter alia, invoking storage operation in support of the storage service implemented by the node.

The network adapter 510 comprises a plurality of ports adapted to couple the node 208.1 to one or more clients 204.1/204.N over point-to-point links, wide area networks, virtual private networks implemented over a public network (Internet) or a shared local area network. The network adapter 510 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 516 cooperates with the storage operating system 506 executing on the node 208.1 to access information requested by the clients. The information may be stored on any type of attached array of writable storage device media such as non-volatile memory, hard disks, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 516 comprises a plurality of ports having input/output (I/O) interface circuitry that couples to the storage devices over an I/O interconnect arrangement, such as a conventional high-performance, FC link topology.

The RL agent 18 may be executed out of memory 504 for detecting problems and self-healing any problems that are associated with a component of node 208.1 or a component connected to node 208.1, as described above in detail.

Figure 5:
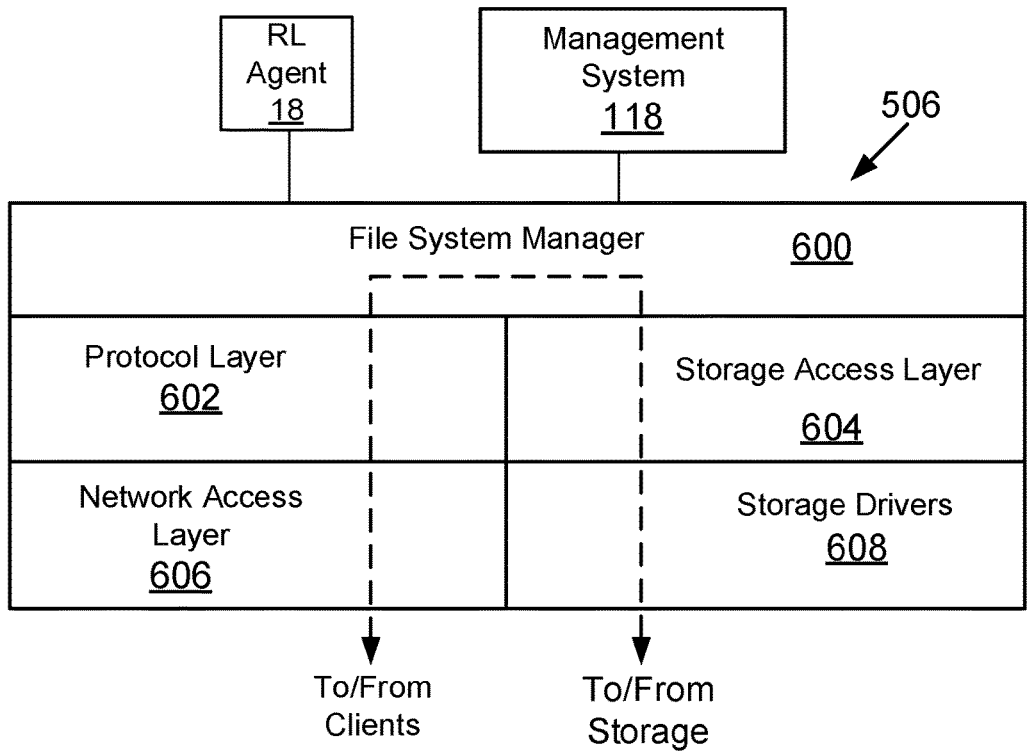
FIG. 5 shows an example of a storage operating system interfacing with a RL agent, used according to one aspect of the present disclosure.

Operating System 506: FIG. 5 illustrates a generic example of storage operating system 506 (or 124, FIG. 1) executed by node 208.1, according to one aspect of the present disclosure. The storage operating system 506 interfaces with the management system 118 to provide information regarding the data stored by the storage nodes. Furthermore, the RL agent 18 may interface with the storage operating system 506 to detect problems associated with storing and retrieving data from one or more storage devices. The RL agent 18 implements the self-healing technology described above to correct any issue related to storing and retrieving data.

In one example, storage operating system 506 may include several modules, or "layers" executed by one or both of N-Module 214 and D-Module 216. These layers include a file system manager 600 that keeps track of a directory structure (hierarchy) of the data stored in storage devices and manages read/write operation, i.e. executes read/write operation on storage in response to client 204.1/204.N requests.

Storage operating system 506 may also include a protocol layer 602 and an associated network access layer 606, to allow node 208.1 to communicate over a network with other systems, such as clients 204.1/204.N. Protocol layer 602 may implement one or more of various higher-level network protocols, such as NFS, CIFS, Hypertext Transfer Protocol (HTTP), TCP/IP and others.

Network access layer 606 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 506.

The storage operating system 506 may also include a storage access layer 604 and an associated storage driver layer 608 to allow D-module 216 to communicate with a storage device. The storage access layer 604 may implement a higher-level storage protocol, such as RAID (redundant array of inexpensive disks), while the storage driver layer 608 may implement a lower-level storage device access protocol, such as FC or SCSI. The storage driver layer 608 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general-purpose operating system. The storage operating system 506 can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 6:
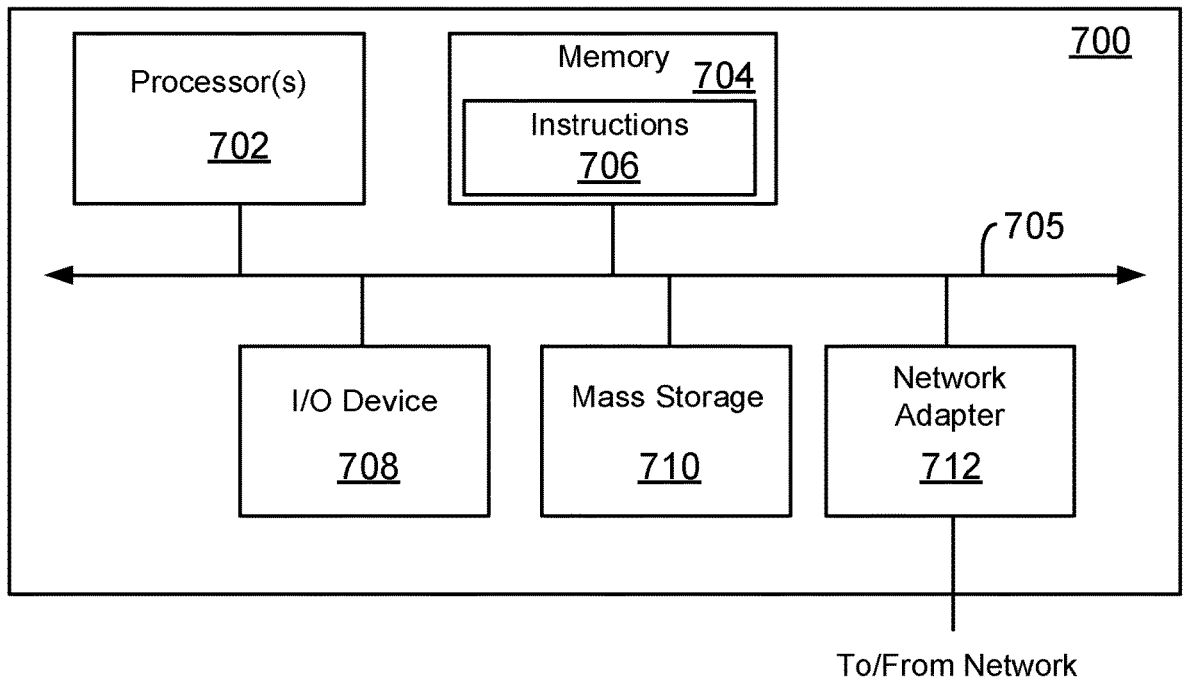
FIG. 6 shows an example of a processing system, used according to one aspect of the present disclosure.

Processing System: FIG. 6 is a high-level block diagram showing an example of the architecture of a processing system 700 that may be used according to one aspect. The processing system 700 can represent a computing device for executing the simulation phase of FIG. 1B, a host system 102, management system 118, clients 116, 204, 232 and/or 234, cloud manager 122/220, and storage systems 108/224A/224B. Note that certain standard and well-known components which are not germane to the present aspects are not shown in FIG. 7.

The processing system 700 includes one or more processor(s) 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 702 are the central processing units (CPUs) of the processing system 700 and, thus, control its overall operation. In certain aspects, the processors 702 accomplish this by executing software stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random-access memory (RAM), read-only memory (ROM), flash memory, or the like, or a combination of such devices. Memory 704 includes the main memory of the processing system 700. Instructions 706 implement the process steps of FIGS. 1B-1F, as described above may reside in and are executed (by processors 702) from memory 704. Memory 704 may also store data structures 20 and 24 as well code for executing the RL agent 18.

Also connected to the processors 702 through the bus system 705 are one or more internal mass storage devices 710, and a network adapter 712. Internal mass storage devices 710 may be or may include any conventional medium for storing large volumes of data in a non-volatile manner, such as one or more magnetic or optical based disks. The network adapter 712 provides the processing system 700 with the ability to communicate with remote devices (e.g., storage servers) over a network and may be, for example, an Ethernet adapter, a Fibre Channel adapter, or the like.

The processing system 700 also includes one or more input/output (I/O) devices 708 coupled to the bus system 705. The I/O devices 708 may include, for example, a display device, a keyboard, a mouse, etc.

Thus, a method and apparatus for self-healing in connected systems have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    representing, by a processor, a plurality of resources of a networked system by a plurality of interconnected nodes of a graphical structure, each node representing a resource, and a graphical edge between connected nodes representing an effect of a source node on another node;
    associating, by the processor, a policy to each node, the policy including an influence factor indicating an impact of a degradation of a first node on a second node and an indicator for triggering an action based on a severity level of a degradation signal impacting each node;
    generating, by the processor, a data structure during a simulation phase for storing one or more potential solution corresponding to an injected error associated with the first node that results in degradation of the second node, the degradation based on the influence factor corresponding to the first node and the potential solution triggered based on the policy associated with the first and second node;
    detecting, by the processor, an error similar to the injected error, during runtime of the networked system; and
    selecting, by the processor, the one or more potential solution from the data structure based on a maximum expected return to self-heal the first node and the second node.

2. The method of claim 1, further comprising: during the simulation phase, initializing an error injector for injecting the error.

3. The method of claim 1, further comprising: during the simulation phase, initializing a reinforced learning agent for storing the one or more potential solutions in the data structure.

4. The method of claim 1, further comprising: maintaining, by the processor, configuration information for each node including a unique node identifier for executing the simulation phase.

5. The method of claim 1, further comprising: applying, by the processor, the one or more potential solution with an option to undo the one or more potential solution, in response to determining that a current state of the first node has never been visited during runtime.

6. The method of claim 5, further comprising: selecting, by the processor, an action with a highest confidence factor from the one or more potential solution, in response to determining that the current state of the first node has been visited during runtime.

7. The method of claim 1, further comprising: updating, by the processor, the data structure, based on solutions executed during runtime of the networked system.

8. A non-transitory machine-readable storage medium having stored thereon instructions for performing a method, comprising machine executable code which when executed by at least one machine, causes the machine to:
    represent a plurality of resources of a networked system by a plurality of interconnected nodes of a graphical structure, each node representing a resource, and a graphical edge between connected nodes representing an effect of a source node on another node;
    associate a policy to each node, the policy including an influence factor indicating an impact of a degradation of a first node on a second node and an indicator for triggering an action based on a severity level of a degradation signal impacting each node;
    generate a data structure during a simulation phase for storing one or more potential solution corresponding to an injected error associated with the first node that results in degradation of the second node, the degradation based on the influence factor corresponding to the first node and the potential solution triggered based on the policy associated with the first and second node;
    detect an error similar to the injected error, during runtime of the networked system; and
    select the one or more potential solution from the data structure based on a maximum expected return to self-heal the first node and the second node.

9. The non-transitory machine-readable storage medium of claim 8, wherein the machine executable code further causes the machine to: during the simulation phase, initialize an error injector for injecting the error.

10. The non-transitory machine-readable storage medium of claim 8, wherein the machine executable code further causes the machine to: during the simulation phase, initialize a reinforced learning agent for storing the one or more potential solutions in the data structure.

11. The non-transitory machine-readable storage medium of claim 8, wherein the machine executable code further causes the machine to: maintain configuration information for each node including a unique node identifier for executing the simulation phase.

12. The non-transitory machine-readable storage medium of claim 8, wherein the machine executable code further causes the machine to: apply the one or more potential solution with an option to undo the one or more potential solution, in response to determining that a current state of the first node has never been visited during runtime.

13. The non-transitory machine-readable storage medium of claim 8, wherein the machine executable code further causes the machine to: select an action with a highest confidence factor from the one or more potential solution, in response to determining that the current state of the first node has been visited during runtime.

14. The non-transitory machine-readable storage medium of claim 8, wherein the machine executable code further causes the machine to: update the data structure, based on solutions executed during runtime of the networked system.

15. A system, comprising:
a memory containing machine readable medium comprising machine executable code having stored thereon instructions; and a processor coupled to the memory to execute the machine executable code to:
represent a plurality of resources of a networked system by a plurality of interconnected nodes of a graphical structure, each node representing a resource, and a graphical edge between connected nodes representing an effect of a source node on another node;
associate a policy to each node, the policy including an influence factor indicating an impact of a degradation of a first node on a second node and an indicator for triggering an action based on a severity level of a degradation signal impacting each node;
generate a data structure during a simulation phase for storing one or more potential solution corresponding to an injected error associated with the first node that results in degradation of the second node, the degradation based on the influence factor corresponding to the first node and the potential solution triggered based on the policy associated with the first and second node;
detect an error similar to the injected error, during runtime of the networked system; and
select the one or more potential solution from the data structure based on a maximum expected return to self-heal the first node and the second node.

16. The system of claim 15, wherein the machine executable code further causes to:
during the simulation phase, initialize an error injector for injecting the error.

17. The system of claim 15, wherein the machine executable code further causes to:
during the simulation phase, initialize a reinforced learning agent for storing the one or more potential solutions in the data structure.

18. The system of claim 15, wherein the machine executable code further causes to:
maintain configuration information for each node including a unique node identifier for executing the simulation phase.

19. The system of claim 15, wherein the machine executable code further causes to:
apply the one or more potential solution with an option to undo the one or more potential solution, in response to determining that a current state of the first node has never been visited during runtime.

20. The system of claim 19, wherein the machine executable code further causes to:
select an action with a highest confidence factor from the one or more potential solution, in response to determining that the current state of the first node has been visited during runtime.

* * * * *